United States Patent
Gibson et al.

(10) Patent No.: US 8,539,132 B2
(45) Date of Patent: Sep. 17, 2013

(54) METHOD AND SYSTEM FOR DYNAMICALLY MANAGING A BUS OF A PORTABLE COMPUTING DEVICE

(75) Inventors: Robert N. Gibson, Boulder, CO (US); Joshua H. Stubbs, Longmont, CO (US)

(73) Assignee: Qualcomm Innovation Center, Inc., San Diego, CA (US)

( * ) Notice: Subject to any disclaimer, the term of this patent is extended or adjusted under 35 U.S.C. 154(b) by 205 days.

(21) Appl. No.: 13/108,554

(22) Filed: May 16, 2011

(65) Prior Publication Data
US 2012/0297106 A1 Nov. 22, 2012

(51) Int. Cl.
*G06F 13/32* (2006.01)
*G06F 13/36* (2006.01)

(52) U.S. Cl.
CPC .............. *G06F 13/32* (2013.01); *G06F 13/36* (2013.01)
USPC ............................ 710/305; 710/104; 710/311

(58) Field of Classification Search
USPC .......................................................... 710/305
See application file for complete search history.

(56) References Cited

U.S. PATENT DOCUMENTS

| | | | | |
|---|---|---|---|---|
| 6,611,886 B1* | 8/2003 | Lee et al. | ......................... | 710/45 |
| 6,820,152 B2* | 11/2004 | Kanzaki et al. | ................ | 710/244 |
| 7,054,968 B2* | 5/2006 | Shrader et al. | ................ | 710/105 |
| 7,155,543 B2* | 12/2006 | Lee et al. | ......................... | 710/58 |
| 7,191,273 B2* | 3/2007 | Weber | ............................ | 710/244 |
| 7,197,591 B2* | 3/2007 | Kwa et al. | ...................... | 710/307 |
| 7,350,004 B2* | 3/2008 | Fukuyama et al. | ............. | 710/241 |
| 7,472,213 B2* | 12/2008 | Fukuyama et al. | ............. | 710/241 |
| 7,536,490 B2* | 5/2009 | Mao | ................................ | 710/104 |
| 7,660,925 B2* | 2/2010 | Larson et al. | .................. | 710/107 |
| 8,151,008 B2* | 4/2012 | Simon et al. | ........................ | 710/6 |
| 8,285,892 B2* | 10/2012 | Arntzen et al. | ................. | 710/35 |
| 8,307,138 B2* | 11/2012 | Mace et al. | ..................... | 710/110 |
| 2005/0060456 A1* | 3/2005 | Shrader et al. | ................ | 710/240 |
| 2008/0022024 A1* | 1/2008 | Mao | ................................ | 710/104 |
| 2008/0049029 A1* | 2/2008 | Kurata et al. | .................. | 345/519 |
| 2008/0263246 A1* | 10/2008 | Larson et al. | .................. | 710/107 |
| 2009/0129404 A1* | 5/2009 | Wu et al. | ........................ | 370/468 |
| 2010/0115167 A1* | 5/2010 | Tardieux et al. | .............. | 710/240 |
| 2011/0302345 A1* | 12/2011 | Boucard et al. | ................ | 710/123 |

* cited by examiner

*Primary Examiner* — Ryan Stiglic
(74) *Attorney, Agent, or Firm* — Neugeboren O'Dowd PC (57) ABSTRACT

A method and system for dynamically managing a bus within a portable computing device ("PCD") are described. The method and system include monitoring software requests with a bus manager. The bus manager determines if a software request needs to be converted into at least one of an instantaneous bandwidth value and an average bandwidth value. The bus manager then converts the software requests into these two types of values as needed. The bus manager calculates a sum of average bandwidth values across all software requests in the PCD. With these values, the bus manager may dynamically adjust settings of the bus based on instantaneous or near instantaneous demands from the master devices. This dynamic adjustment of the bus settings may afford more power savings for the PCD during low loads or during sleep states.

32 Claims, 6 Drawing Sheets

REQUEST TYPE(S)

TYPE 2 - "CPU STYLE" REQUEST(S)

$I_b$ = THROUGHPUT BANDWIDTH OF CPU $A_b$ = THROUGHPUT X Z%

Z = CASHE MISS %, USAGE %, ETC.

METHOD AND SYSTEM FOR DYNAMICALLY MANAGING A BUS OF A PORTABLE COMPUTING DEVICE

DESCRIPTION OF THE RELATED ART

Portable computing devices ("PCDs") are becoming necessities for people on personal and professional levels. These devices may include cellular telephones, portable digital assistants ("PDAs"), portable game consoles, palmtop computers, and other portable electronic devices.

PCDs typically have complex and compact electronic packaging that is generally made of multiple processing units that include central processing units, digital signal processors, and the like. Much of this hardware may be part of a system on a chip ("SOC") design as understood by one of ordinary skill in the art.

The central processing units and digital signal processors running application programs on PCDs are usually referred to as masters in a master-slave hierarchy for a PCD. Meanwhile, subordinate devices that serve requests initiated by the masters are usually referred to as slaves in the master-slave hierarchy. The subordinate devices referred to as slaves (relative to the masters) may include, but are not limited to, registers, video bus managers, memory maps, memory, buses, and configuration ports.

The masters typically communicate with the slaves over a communication bus. In the PCD environment, if settings for the communication bus are kept at minimal levels, significant power may be saved for the PCD. Such power savings for a PCD may extend battery life and performance for a PCD.

One problem in the conventional art is that minimal level bus settings are difficult to achieve since bus settings are established prior to run-time and are usually fixed or stagnant. Prior to run-time of a PCD, a fixed table of bus settings is usually established off-line and based on the demands that masters may have on their slaves in the PCD. These bus settings are usually calculated based on theoretical maximum demands for the masters and their slaves. The bus settings typically do not provide any minimal settings so that power used for the bus may be conserved during off-peak or low demand periods.

Accordingly, what is needed in the art is a method and system for allowing bus settings to be established dynamically, based on current demands of a PCD. Another need exists in the art that allows bus settings of a PCD to vary based on the current loads experienced and/or projected for masters and slaves during run-time of an active PCD.

SUMMARY

A method and system for dynamically managing a bus within a portable computing device ("PCD") are described. The method and system include monitoring software requests with a bus manager. The software requests may be issued by master devices that are intended for slave devices. The master devices may include processors and digital signal processors, while the slave devices may include devices like memory and video controllers. The bus manager determines if a software request needs to be converted into at least one of an instantaneous bandwidth value and an average bandwidth value. The bus manager then converts the software requests into these two types of values as needed. The bus manager calculates a sum of average bandwidth values across all software requests in the PCD. With these values, the bus manager may dynamically adjust settings of the bus based on instantaneous or near instantaneous demands from the master devices. This dynamic adjustment of the bus settings may afford more power savings for the PCD during low loads or during sleep states.

BRIEF DESCRIPTION OF THE DRAWINGS

In the figures, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component.

One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "communication device," "wireless device," "wireless telephone," "wireless communication device," and "wireless handset" are used interchangeably. With the advent of third generation ("3G") and fourth generation ("4G") wireless technology, greater bandwidth availability has enabled more portable computing devices with a greater variety of wireless capabilities.

In this description, the term "portable computing device" ("PCD") is used to describe any device operating on a limited capacity power supply, such as a battery. Although battery operated PCDs have been in use for decades, technological advances in rechargeable batteries coupled with the advent of third generation ("3G") and fourth generation ("4G") wireless technology, have enabled numerous PCDs with multiple capabilities. Therefore, a PCD may be a cellular telephone, a satellite telephone, a pager, a PDA, a smartphone, a navigation device, a smartbook or reader, a media player, a combination of the aforementioned devices, and a laptop computer with a wireless connection, among others.

Figure 1:
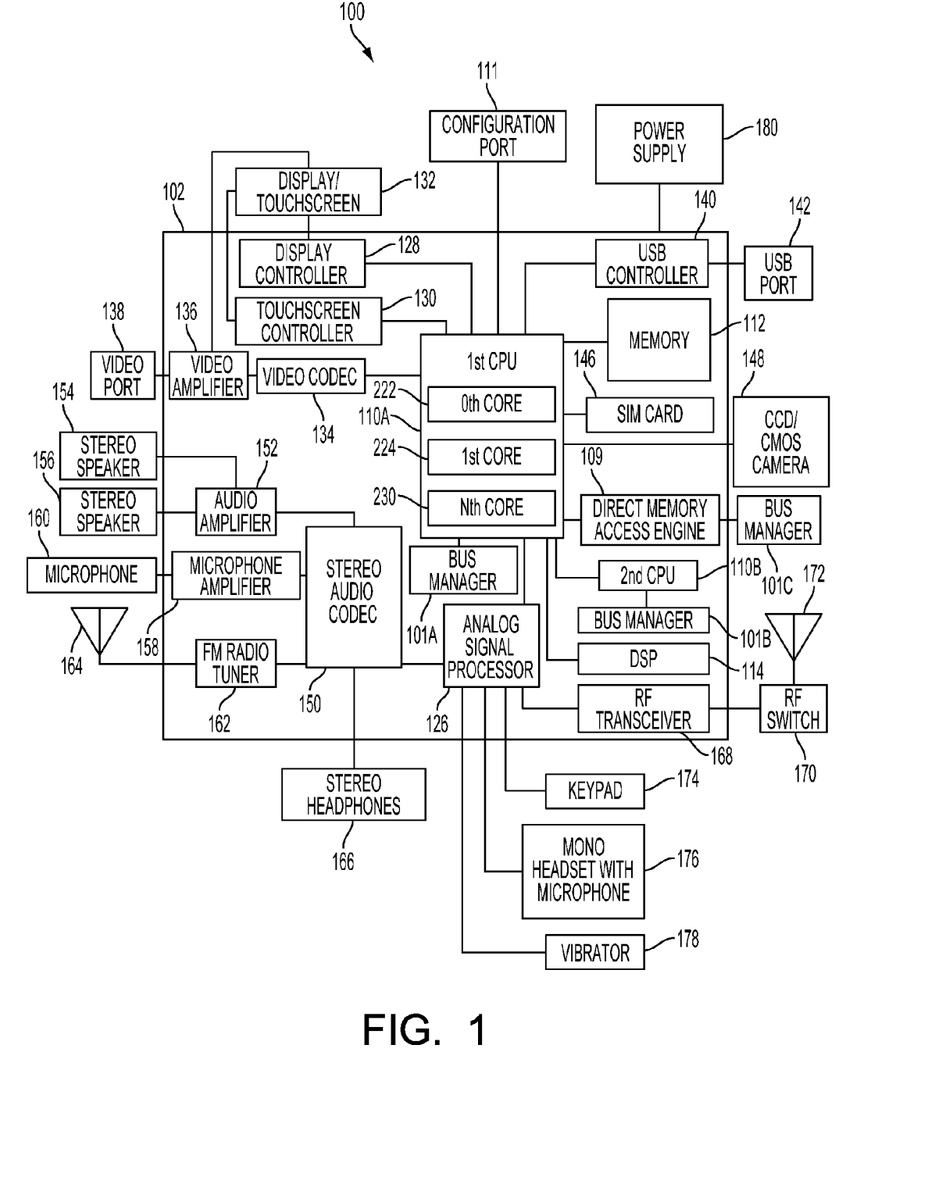
FIG. 1 is a functional block diagram illustrating an embodiment of a portable computing device (PCD)

FIG. 1: Elements of PCD 100 for Dynamically Managing a Bus 107

Referring to FIG. 1, this figure is a functional block diagram of an exemplary, non-limiting aspect of a PCD 100 in the form of a wireless telephone for implementing methods and systems for dynamically managing settings of a bus 107 (See FIG. 2) within the PCD 100. As shown, the PCD 100 includes an on-chip system 102 that includes a multi-core, first central processing unit ("CPU") 110A, a second CPU 110B that is a single-core type, and an analog signal processor 126.

These three processors 110A, 110B, and 126 may be coupled together. The first CPU 110A may comprise a zeroth core 222, a first core 224, and an Nth core 230 as understood by one of ordinary skill in the art. In an alternate embodiment, instead of using two CPUs 110, two digital signal processors ("DSPs") may also be employed as understood by one of ordinary skill in the art.

FIG. 1 includes one or more bus manager module(s) 101. For the remainder of this description, the bus manager module(s) 101 will be referred to in the singular, as a bus manager 101, and not plural. One of ordinary skill in the art will recognize that the bus manager 101 may be divided into various parts and executed by different processors 110, 126 without departing from the invention. Alternatively, the bus manager 101 may be organized as a single element and executed by a single processor 110 or 126.

The bus manager 101 may comprise software which is executed by the CPUs 110. However, the bus manager 101 may also be formed from hardware and/or firmware as understood by one of ordinary skill in the art. When formed from hardware, the bus manager 101 may be integral with the bus 107 or positioned in close physical proximity to the bus 107.

In general, the bus manager 101 may be responsible for dynamically managing software requests that are propagated over a bus 107 (See FIG. 2) between masters and slaves. The bus manager 101 may adjust the settings for the bus 107 based on current demands (provided in the software requests) from the master processors 110, 126 and corresponding slaves (See FIG. 2). The bus manager 101 may conserve power for a PCD 100 by its continuous monitoring of the software requests issued by masters and by adjusting bus settings based on those software requests.

FIG. 1 shows that the PCD 100 may include memory 112. The bus manager 101 running on the CPUs 110 may access the memory 112 to facilitate dynamic adjustments to bus settings.

In a particular aspect, one or more of the method steps described herein may implemented by executable instructions and parameters stored in the memory 112 that form the bus manager 101. These instructions that form the bus manager 101 may be executed by the CPUs 110, the analog signal processor 126, or another processor. Further, the processors, 110, 126, the memory 112, the instructions stored therein, or a combination thereof may serve as a means for performing one or more of the method steps described herein.

FIG. 1: Other Elements of the PCD 100

A display controller 128 and a touchscreen controller 130 are coupled to the digital signal processor 110. A touchscreen display 132 external to the on-chip system 102 is coupled to the display controller 128 and the touchscreen controller 130.

FIG. 1 is a schematic diagram illustrating an embodiment of a portable computing device (PCD) that includes a video coder/decoder ("codec") 134, e.g., a phase-alternating line ("PAL") encoder, a sequential couleur avec memoire ("SECAM") encoder, a national television system(s) committee ("NTSC") encoder or any other type of video encoder 134. The video codec 134 is coupled to the multicore central processing unit ("CPU") 110. A video amplifier 136 is coupled to the video encoder 134 and the touchscreen display 132. A video port 138 is coupled to the video amplifier 136. As depicted in FIG. 1, a universal serial bus ("USB") bus manager 140 is coupled to the CPU 110. Also, a USB port 142 is coupled to the USB bus manager 140. A subscriber identity module (SIM) card 146 may also be coupled to the CPU 110. Further, as shown in FIG. 1, a digital camera 148 may be coupled to the CPU 110. In an exemplary aspect, the digital camera 148 is a charge-coupled device ("CCD") camera or a complementary metal-oxide semiconductor ("CMOS") camera.

As further illustrated in FIG. 1, a stereo audio CODEC 150 may be coupled to the analog signal processor 126. Moreover, an audio amplifier 152 may be coupled to the stereo audio CODEC 150. In an exemplary aspect, a first stereo speaker 154 and a second stereo speaker 156 are coupled to the audio amplifier 152. FIG. 1 shows that a microphone amplifier 158 may be also coupled to the stereo audio CODEC 150. Additionally, a microphone 160 may be coupled to the microphone amplifier 158. In a particular aspect, a frequency modulation ("FM") radio tuner 162 may be coupled to the stereo audio CODEC 150. Also, an FM antenna 164 is coupled to the FM radio tuner 162. Further, stereo headphones 166 may be coupled to the stereo audio CODEC 150.

FIG. 1 further indicates that a radio frequency ("RF") transceiver 168 may be coupled to the analog signal processor 126. An RF switch 170 may be coupled to the RF transceiver 168 and an RF antenna 172. As shown in FIG. 1, a keypad 174 may be coupled to the analog signal processor 126. Also, a mono headset with a microphone 176 may be coupled to the analog signal processor 126. Further, a vibrator device 178 may be coupled to the analog signal processor 126. FIG. 1 also shows that a power supply 180, for example a battery, is coupled to the on-chip system 102. In a particular aspect, the power supply 180 includes a rechargeable DC battery or a DC power supply that is derived from an alternating current ("AC") to DC transformer that is connected to an AC power source.

As depicted in FIG. 1, the touchscreen display 132, the video port 138, the USB port 142, the camera 148, the first stereo speaker 154, the second stereo speaker 156, the microphone 160, the FM antenna 164, the stereo headphones 166, the RF switch 170, the RF antenna 172, the keypad 174, the mono headset 176, the vibrator 178, thermal sensors 157B, and the power supply 180 are external to the on-chip system 322. However, one of ordinary skill in the art will appreciate that each of these elements separately or collectively may be internal or part of the on-chip system 322 in other exemplary embodiments.

The first CPU 110A may also be coupled to a configuration port 111, a dynamic memory allocation/access ("DMA") engine 109, and a digital signal processor ("DSP") 114. Further details about the configuration port 11, DMA engine 109, and DSP 114 will be described below in connection with FIG. 2.

Figure 2:
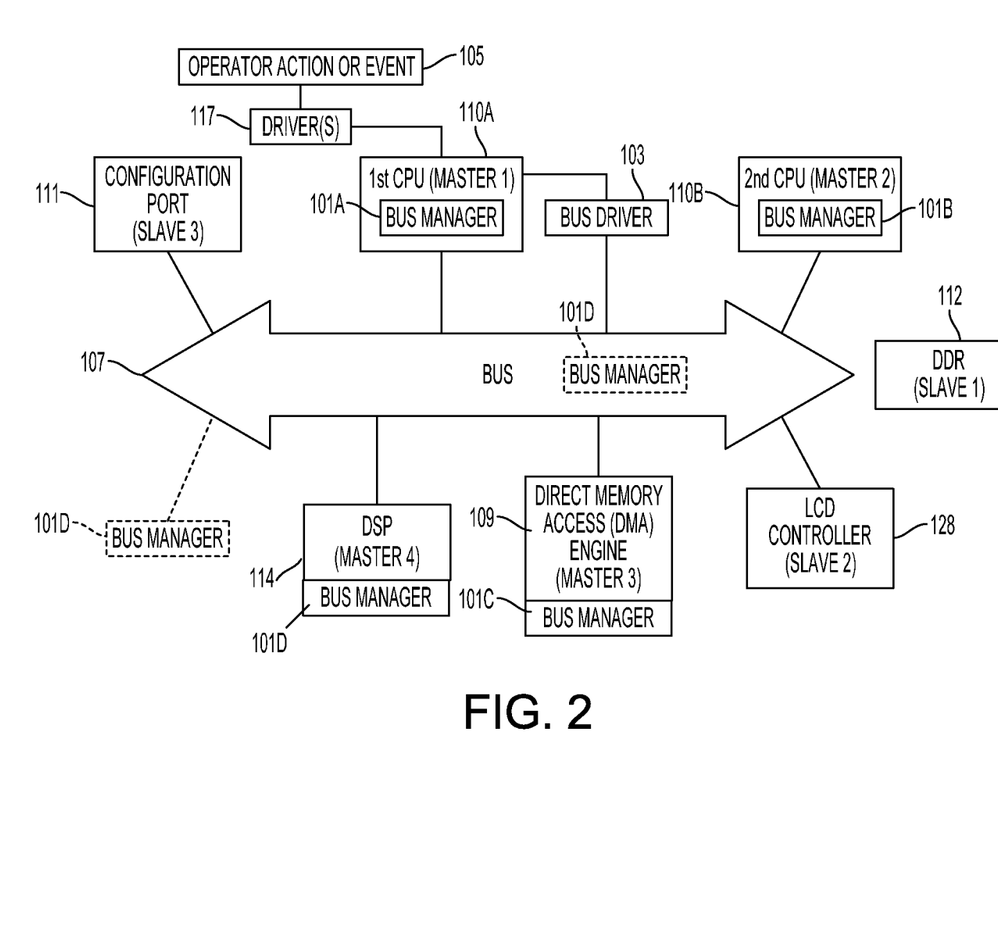
FIG. 2 is a functional block diagram illustrating a bus that couples master and slaves together.

FIG. 2 is a functional block diagram illustrating a bus 107 that couples master and slaves together. The bus 107 is coupled to the configuration port 111, the first CPU 110A, the second CPU 110B, a double data rate synchronous dynamic random access memory ("DDR SDRAM") 112, liquid crystal display controller 128, DMA 109, and a DSP 114.

The first CPU 110A may be referenced as a first master in a master-slave hierarchy for the bus 107. The second CPU 110B and DMA engine 109 may be referenced as the second and third masters respectively. The DSP 114 may be referenced as a fourth master.

Meanwhile, the DDR memory 112, LCD controller 128, and configuration port 111 may be referenced as the first, second, and third slaves in the master-slave hierarchy for the bus 107. Each of these slaves may service software requests generated by a respective master.

As illustrated in FIG. 2, portions of the bus manager 101 may comprise software that resides on and is executed by each of the three masters: the first CPU 110A, the second CPU 110B, and the DMA engine 109. Alternatively, according to another exemplary embodiment, the bus manager 101D (illustrated with dashed lines) may comprise hardware that is coupled to the bus 107 and/or is part of the bus 107.

As noted previously, the four masters include the first CPU 110A, second CPU 110B, a DMA engine 101C, and DSP 114. One of ordinary skill in the art will appreciate that a fewer number or a greater number of masters may be employed in the system without changing its scope. This also is true for slaves: a fewer number or greater number of slaves may be employed as understood by one of ordinary skill in the art.

The bus manager 101 may review software requests issued by each of the three masters. The bus manager 101 may also adjust settings of the bus 107 in response to its review of the software requests and their corresponding demands.

In exemplary embodiments of PCD 100, the number of masters will often exceed the number of slaves. For example, a PCD 100 may have between about forty to about fifty masters, and between about ten to about fifteen slaves.

The bus manager 101 may characterize or categorize software requests issued by masters, like first CPU 110A and second CPU 110B, according to two or more types. Each category or type may comprise metrics or ways to measure a software request in a quantitative manner. After the bus manager 101 quantifies or determines the metrics of a given software request, the bus manager 101 may add-up a plurality of software requests to calculate the total demand the bus 107 may need to manage at a given instant of time. Further details about software requests will be described below in connection with FIG. 4.

As an example of how a software request may be generated, FIG. 2 illustrates an operator action 105 that activates a driver 117. For example, an operator may touch a display screen 132 which may activate a driver 117. This driver 117 may cause a first "master" processor 110A to issue a software request for the "slave" LCD controller 128. The bus manager 101A may review this software request originating from the first master processor 110A.

Figure 3:
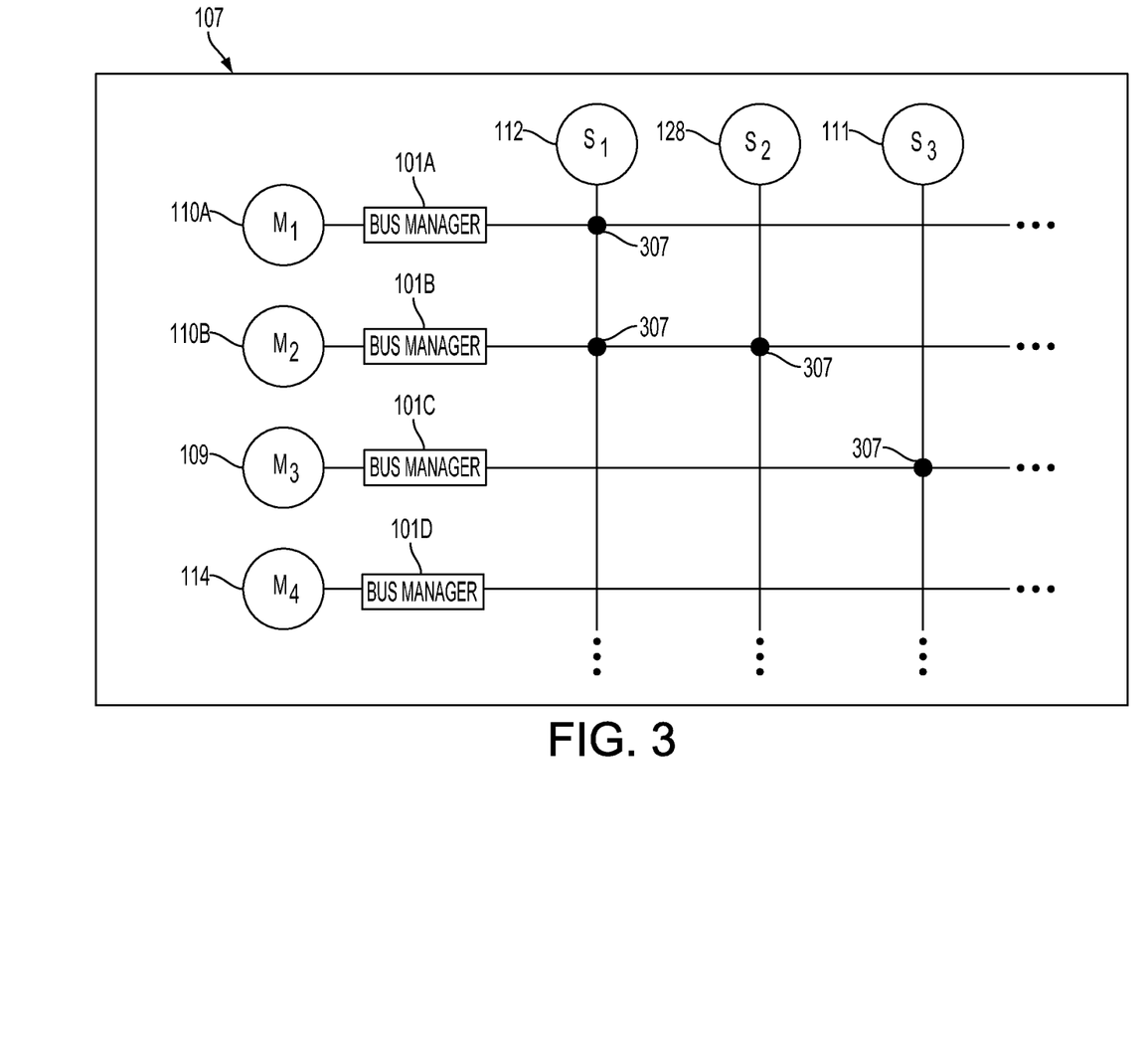
FIG. 3 is a functional block diagram illustrating details of a switch fabric for a bus architecture.

FIG. 3 is a functional block diagram illustrating details of a switch fabric forming one exemplary embodiment of a bus architecture 107. The letter "M" in this diagram represents masters in a master-slave hierarchy for a bus 107 while the letter "S" in this diagram represents slaves.

The switch fabric forming a bus architecture 107 may comprise a network topology where network nodes (M1, M2, M3, S1, S2, S3) connect with each other via one or more network switches such as by crossbar switches 307. The switch fabric may offer better total throughput compared to other bus designs, because traffic is spread across multiple physical links.

In the exemplary embodiment of FIG. 3, the first Master 1 110A may be coupled to the first Slave 1 112, second Slave 2 128, and third Slave 3 111. Similarly, the second Master 2 110B may be coupled to the first Slave 1 112, second Slave 2 128, and third Slave 3 111. And so on. An exemplary implementation of a switched fabric 303 as of this writing is PCI Express.

As illustrated in FIG. 3, the first three masters M1, M2, and M3 may comprise portions/parts of the bus manager 101A-D. These components of the bus manager 101A-D that communicate with one another as will be described below in connection with the flow chart of FIG. 6.

Figure 4:
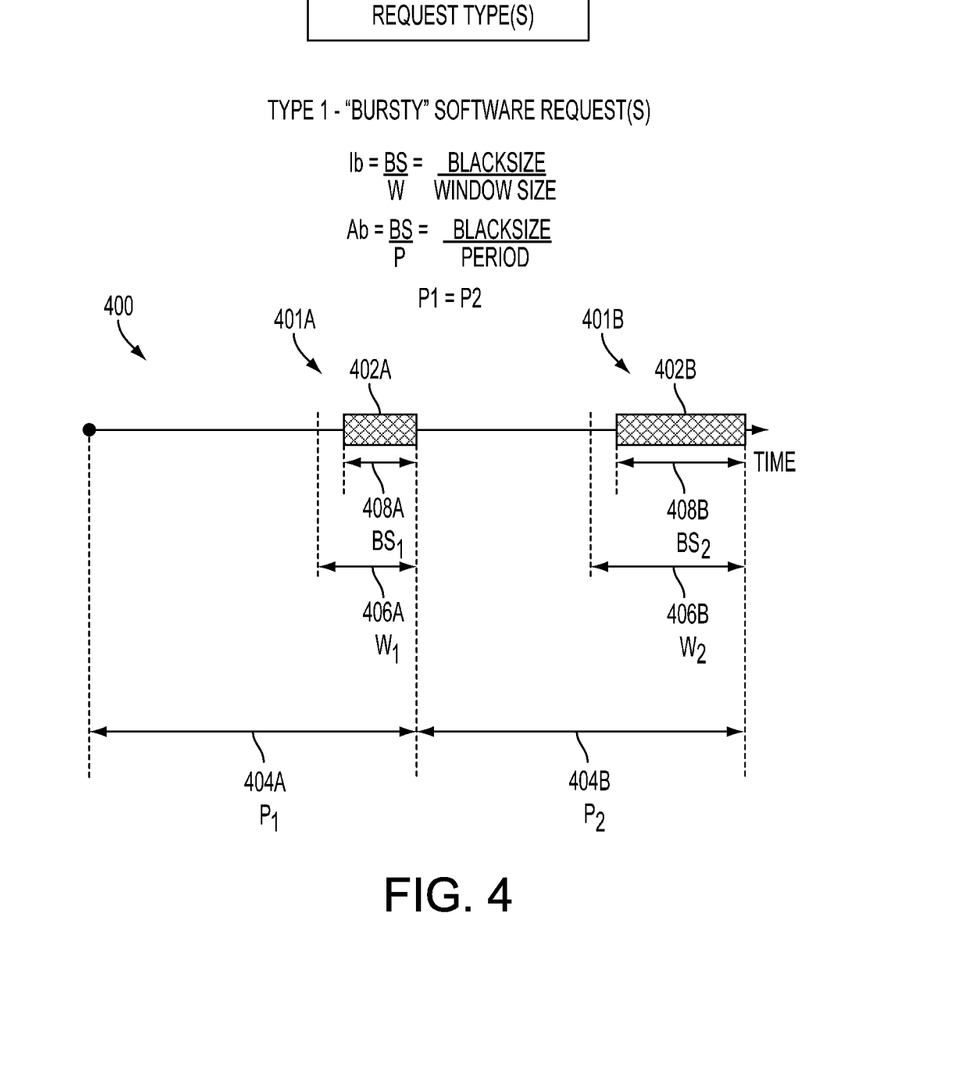
FIG. 4 illustrates an exemplary first software request type.

FIG. 4 illustrates an exemplary first software request type 401 characterized as "bursty." Each software request, such as the first "bursty" software request type 401, may be measured with two different metrics: instantaneous bandwidth (Ib) and average bandwidth (Ab).

The instantaneous bandwidth (Ib) may represent a worst case need/scenario for a bus 107 across all masters in the master-slave hierarchy for the bus 107. Ib may be generally characterized as the "speed limit" of a bus since this parameter may be used by the bus manager 101 to set the frequency of the bus 107. The calculation and/or corresponding equation to determine Ib may be unique for each type of software request.

The average bandwidth (Ab) may represent an actual data size that is propagated over the bus 107. Ab may be used by the bus manager 101 to set arbitration rules among masters and slaves for a bus 107.

The first software request type 401 was characterized as "bursty" to address software requests that provide for discontinuous use of a bus 107. These software request types may transmit large blocks of data over the bus 107 within very short time intervals and then remain dormant for some period of time. The dormant stage may usually last longer than the active time used to transmit the large blocks of data.

For the first "bursty" software request type 401, the Ib value may be determined by the following equation:

$$Ib = BS/W \qquad \text{EQN:1}$$

where "Ib" is instantaneous bandwidth; "BS" is block size expressed in number of bytes, and "W" is window size expressed in units of time, such as milliseconds.

The Ab value for the first "bursty" software request type may be determined by the following equation:

$$Ab = BS/P \qquad \text{EQN:2}$$

where "Ab" is average bandwidth; "BS" is block size expressed in number of bytes, and "P" is period expressed in units of time, such as milliseconds.

FIG. 4 illustrates two different "bursty" software requests 401A, 401B. The first software request 401A has a first data block 402A while the second software request 401B has a second data block 402B.

In this exemplary embodiment, the magnitude of the first and second periods P1 404A, P2 404A are equal, while the first and second windows W1 406A, W2 406B (which are time frames within the periods P1 and P2) have different magnitudes relative to each other. The first and second block sizes BS1 408A, BS2 408B also have different magnitudes relative to each other.

Since the magnitude of the first block size BS1 402A is relatively small relative to the first period P1 404A, then the average bandwidth Ab value for the first bursty software request 401A will not be that significant in view of Equation (2) for this software request type. Meanwhile, since the magnitude of the second block size BS2 402B is relatively larger relative to the second period P1 404B, then the average bandwidth Ab value for the second bursty software request 401B will be a little greater than the first software request 401A.

Because the block sizes BS for each software request 401A, 401B have magnitudes which are close to their window sizes W1 406A, W2 406B, the instantaneous bandwidth values Ib for these two requests 401 may be significant in view of Equation (1) for this software request type. Both Ib values for these requests 401A, 401B may also be very close in magnitude relative to one another.

Figure 5:
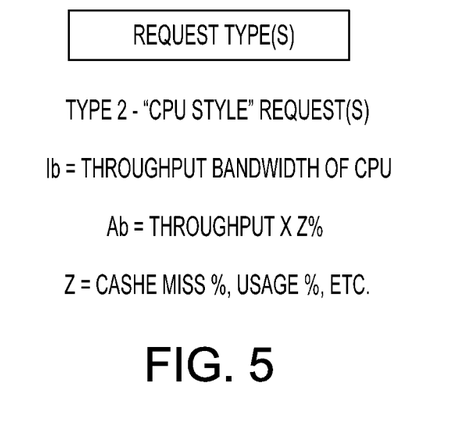
FIG. 5 illustrates an exemplary second software request type.

FIG. 5 illustrates an exemplary second software request type 501 that may be characterized as a "CPU" type 501. CPU software request types 501 usually originate from central processing units (CPUs) 110. The instantaneous bandwidth Ib value may be determined as follows:

$$Ib = \text{Throughput Bandwidth} \qquad \text{EQN 3}$$

where "Ib" is the instantaneous bandwidth; and Throughput Bandwidth is the desired clock speed of the CPU 110.

The average bandwidth Ab value for CPU software request types 501 may be determined as follows:

$$Ab = T \times UM\% (\text{percentage}) \qquad \text{EQN 4}$$

where "Ab" is average bandwidth; where "T" is Throughput Bandwidth described above; and "UM %" is a percentage of use, or a percentage of cache misses.

For example, for a DMA engine 109 that moves data at 100 Mb per second with a usage rate of 50%, the average bandwidth Ab value would be equal to 100×0.50 which is fifty Mb per second. The instantaneous bandwidth Ib for this DMA engine 109 would be equal to 100 Mb per second.

Meanwhile, a CPU 110 running at 1 GHz translates into a throughput of 800 Mb per second. This throughput value would be equal to the instantaneous bandwidth Ib. If the CPU 110 utilize a cache with a cache miss rate of 10%, then the average bandwidth Ab value would be equal to (800×0.10) which is 80 Mb per second.

One of ordinary skill in the art will recognize that other software request types may be defined differently in terms of instantaneous bandwidth Ib and the average bandwidth Ab values. These yet to be determined software request types may comprise different equations for arriving at the Ib and Ab values. But because the software request types will be expressed in terms of Ib and Ab values, then the different software request types may be aggregated together to provide the bus manager 101 with a good estimate of a current demand for a bus 107.

Figure 6:
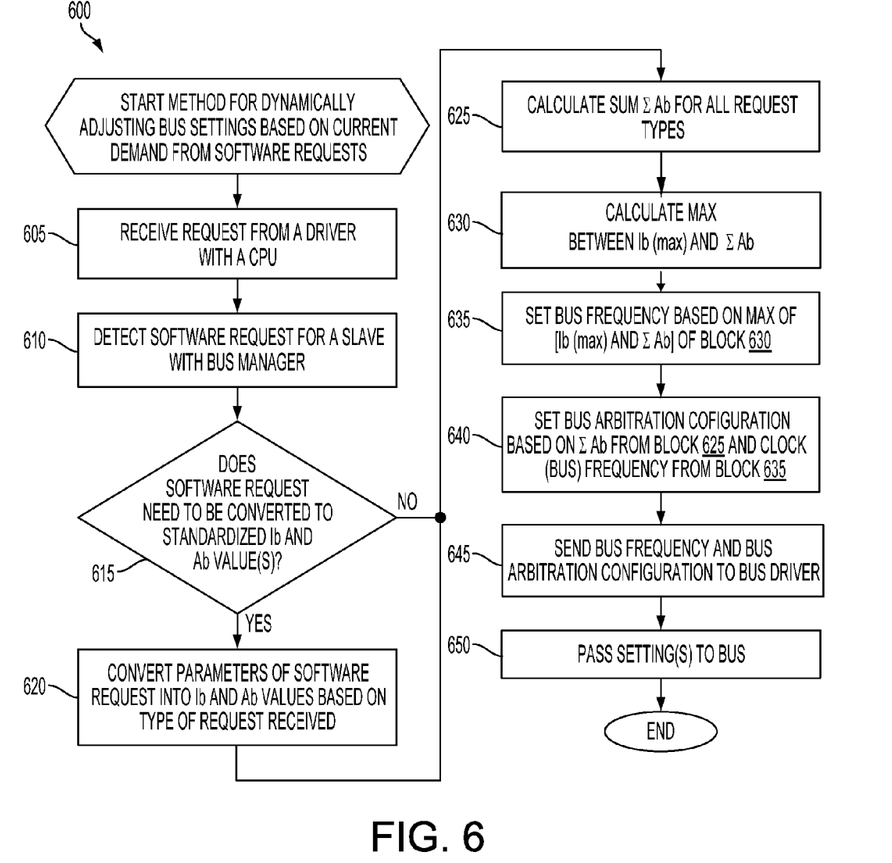
FIG. 6 is a logical flowchart illustrating a method for dynamically managing a bus of a PCD.

FIG. 6 is a logical flowchart illustrating a method 600 for dynamically managing a bus 107 of a PCD 100. Block 605 is the first step of method 600. In block 605, a CPU 110 may receive a request from a driver 117 in response to action from an operator or some other action as illustrated in FIG. 2. Next, in block 610, the bus manager 101 may detect a software request for a slave originating from the CPU 110.

In decision block 615, the bus manager 101 determines if the software request needs to be converted to standardized instantaneous bandwidth (Ib) and average bandwidth (Ab) values. If the inquiry to decision block 615 is negative, then the "NO" branch is followed to block 625. If the inquiry to decision block 615 is positive, then the "YES" branch is followed to block 620.

In block 620, the bus manager 101 converts parameters of the software request into instantaneous bandwidth (Ib) and average bandwidth (Ab) values based on the software request type and the corresponding equations, such as Equations (1)-(4) described above in connection with FIG. 4 and FIG. 5.

In block 625, the bus manager 101 calculates a sum of all average bandwidth (Ab) values for all software requests that have been issued by respective masters 110 of a PCD 100. Next, in block 630 the bus manager 101 determines the maximum between two values: the maximum instantaneous bandwidth (Ib) value compared against the sum of all average bandwidth (Ab) values for all software requests (this is the value calculated in block 625).

Next, in block 635, the bus manager 101 sets the bus frequency based on the maximum value which was calculated in block 630 (max value between: single max Ib value and sum of all Ab values). In block 640, the bus manager 101 sets the bus arbitration configuration for the bus 107 based on the summed average bandwidth (Ab) across all software requests and the clock frequency value established in block 635.

In block 645, the bus manager 101 transmits the bus frequency and bus arbitration configuration to the bus driver 103. The bus driver 103 in block 650 passes the settings to the bus 107. Then, the method 600 ends.

As noted previously, blocks 625 through blocks 640 may be performed by a single processor 110. In an alternative exemplary embodiment, blocks 65 through blocks 640 may be performed by a dedicated piece of hardware formed within the bus 107 war positioned in close proximity to the bus 107.

Blocks 605 through 620 may be performed among a plurality of processors 110 according to an exemplary embodiment. Alternatively, as noted above, blocks 605 through 640 may be executed by a single processor 110. Other variations of executing the software forming the bus manager 101 will be apparent to one of ordinary skill in the art.

Further, one of ordinary skill in the art recognizes that certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the disclosed system and method. In some instances, certain steps may be omitted or not performed without departing from the method as understood by one of ordinary skill in the art. Further, words such as "thereafter", "then", "next", etc. are not intended to limit the order of the steps. These words are simply used to guide the reader through the description of the exemplary method.

In view of the disclosure above, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the FIGs. which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Therefore, although selected aspects have been illustrated and described in detail, it will be understood that various substitutions and alterations may be made therein without departing from the spirit and scope of the present invention, as defined by the following claims.

What is claimed is:

1. A method for dynamically managing a bus within a portable computing device ("PCD") comprising:
    monitoring software requests with a bus manager;
    converting the software requests to instantaneous bandwidth values;
    converting the software requests to average bandwidth values;
    calculating a sum of the average bandwidth values;
    calculating a maximum of the instantaneous bandwidth values; and
    setting a bus frequency based on a greater of (1) the sum of the average bandwidth values, and (2) the maximum of the instantaneous bandwidth values.

2. The method of claim 1, wherein the conversion of the software requests to the instantaneous bandwidth values is governed by an equation.

3. The method of claim 2, wherein the equation for instantaneous bandwidth comprises:

$$Ib=BS/W$$

where "Ib" is instantaneous bandwidth; "BS" is block size expressed in number of bytes, and "W" is window size expressed in units of time.

4. The method of claim 2, wherein the equation for instantaneous bandwidth comprises:

$$Ib=\text{Throughput Bandwidth}$$

where "Ib" is the instantaneous bandwidth; and Throughput Bandwidth is the desired clock speed of a central processing unit issuing a software request.

5. The method of claim 1, wherein the conversion of the software request to an average bandwidth value is governed by an equation.

6. The method of claim 5, wherein the equation for average bandwidth comprises:

$$Ab=BS/P$$

where "Ab" is average bandwidth; "BS" is block size expressed in number of bytes, and "P" is period expressed in units of time.

7. The method of claim 5, wherein the equation for average bandwidth comprises:

$$Ab=T\times(UM\%)$$

where "Ab" is average bandwidth; where "T" is the desired clock speed of a central processing unit issuing a software request; and "UM %" is a percentage of at least one of use and a percentage of cache misses.

8. The method of claim 1, further comprising:
    setting a bus arbitration configuration based on the sum of the average bandwidth values and the bus frequency.

9. A computer system for dynamically managing a bus within a portable computing device, the system comprising:
    a processor operable for:
        monitoring software requests with a bus manager;
        converting the software requests to instantaneous bandwidth values;
        converting the software requests to average bandwidth values;
        calculating a sum of the average bandwidth values;
        calculating a maximum of the instantaneous bandwidth values; and
        setting a bus frequency based on a greater of (1) the sum of average bandwidth values, and (2) the maximum of the instantaneous bandwidth values.

10. The system of claim 9, wherein the conversion of the software requests to the instantaneous bandwidth values is governed by an equation.

11. The system of claim 10, wherein the equation for instantaneous bandwidth comprises:

$$Ib=BS/W$$

where "Ib" is instantaneous bandwidth; "BS" is block size expressed in number of bytes, and "W" is window size expressed in units of time.

12. The method of claim 10, wherein the equation for instantaneous bandwidth comprises:

$$Ib=\text{Throughput Bandwidth}$$

where "Ib" is the instantaneous bandwidth; and Throughput Bandwidth is the desired clock speed of a central processing unit issuing a software request.

13. The system of claim 9, wherein the conversion of the software requests to the average bandwidth values is governed by an equation.

14. The method of claim 13, wherein the equation for average bandwidth comprises:

$$Ab=BS/P$$

where "Ab" is average bandwidth; "BS" is block size expressed in number of bytes, and "P" is period expressed in units of time.

15. The method of claim 13, wherein the equation for average bandwidth comprises:

$$Ab = T \times (UM\%)$$

where "Ab" is average bandwidth; where "T" is the desired clock speed of a central processing unit issuing a software request; and "UM %" is a percentage of at least one of use and a percentage of cache misses.

16. The system of claim 9, wherein the processor is further operable for:
setting a bus arbitration configuration based on the sum of the average bandwidth values and the bus frequency.

17. A computer system for dynamically managing a bus within a portable computing device ("PCD"), the system comprising:
means for monitoring software requests with a bus manager;
means for converting the software requests to instantaneous bandwidth values;
means for converting the software requests to average bandwidth values;
means for calculating a sum of the average bandwidth values;
means for calculating a maximum of the instantaneous bandwidth values; and
means for setting a bus frequency based on a greater of (1) the sum of average bandwidth values, and (2) the maximum of the instantaneous bandwidth values.

18. The system of claim 17, wherein the conversion of the software request to an instantaneous bandwidth value is governed by an equation.

19. The system of claim 18, wherein the equation for instantaneous bandwidth comprises:

$$Ib = BS/W$$

where "Ib" is instantaneous bandwidth; "BS" is block size expressed in number of bytes, and "W" is window size expressed in units of time.

20. The system of claim 18, wherein the equation for instantaneous bandwidth comprises:

$$Ib = \text{Throughput Bandwidth}$$

where "Ib" is the instantaneous bandwidth; and Throughput Bandwidth is the desired clock speed of a central processing unit issuing a software request.

21. The system of claim 17, wherein the conversion of the software request to an average bandwidth value is governed by an equation.

22. The method of claim 21, wherein the equation for average bandwidth comprises:

$$Ab = BS/P$$

where "Ab" is average bandwidth; "BS" is block size expressed in number of bytes, and "P" is period expressed in units of time.

23. The system of claim 21, wherein the equation for average bandwidth comprises:

$$Ab = T \times (UM\%)$$

where "Ab" is average bandwidth; where "T" is the desired clock speed of a central processing unit issuing a software request; and "UM %" is a percentage of at least one of use and a percentage of cache misses.

24. The system of claim 17, further comprising:
means for setting a bus arbitration configuration based on the sum of the average bandwidth values and the bus frequency.

25. A non-transitory, tangible, computer readable storage medium, encoded with processor readable instructions to perform a method for dynamically managing a bus within a portable computing device ("PCD"), said method comprising:
monitoring software requests with a bus manager;
converting the software requests to instantaneous bandwidth values;
converting the software requests to average bandwidth values;
calculating a sum of the average bandwidth values;
calculating a maximum of the instantaneous bandwidth values; and
setting a bus frequency based on a greater of (1) the sum of the average bandwidth values and (2) the maximum of the instantaneous bandwidth values.

26. The non-transitory, tangible, computer readable storage medium of claim 25, wherein the conversion of the software requests to the instantaneous bandwidth values is governed by an equation.

27. The non-transitory, tangible, computer readable storage medium of claim 26, wherein the equation for instantaneous bandwidth comprises:

$$Ib = BS/W$$

where "Ib" is instantaneous bandwidth; "BS" is block size expressed in number of bytes, and "W" is window size expressed in units of time.

28. The non-transitory, tangible, computer readable storage medium of claim 26, wherein the equation for instantaneous bandwidth comprises:

$$Ib = \text{Throughput Bandwidth}$$

where "Ib" is the instantaneous bandwidth; and Throughput Bandwidth is the desired clock speed of a central processing unit issuing a software request.

29. The non-transitory, tangible, computer readable storage medium of claim 25, wherein the conversion of the software request to an average bandwidth value is governed by an equation.

30. The non-transitory, tangible, computer readable storage medium of claim 29, wherein the equation for average bandwidth comprises:

$$Ab = BS/P$$

where "Ab" is average bandwidth; "BS" is block size expressed in number of bytes, and "P" is period expressed in units of time.

31. The non-transitory, tangible, computer readable storage medium of claim 29, wherein the equation for average bandwidth comprises:

$$Ab = T \times (UM\%)$$

where "Ab" is average bandwidth; where "T" is the desired clock speed of a central processing unit issuing a software request; and "UM %" is a percentage of at least one of use and a percentage of cache misses.

32. The non-transitory, tangible, computer readable storage medium of claim 25, wherein the non-transitory, tangible, computer readable storage medium further comprises:
setting a bus arbitration configuration based on the sum of the average bandwidth values and the bus frequency.

* * * * *